June 10, 1958  C. A. HALLAM ET AL  2,837,764
PRESSURIZED COOLING TROUGH FOR EXTRUDERS
Filed March 15, 1955  2 Sheets-Sheet 1
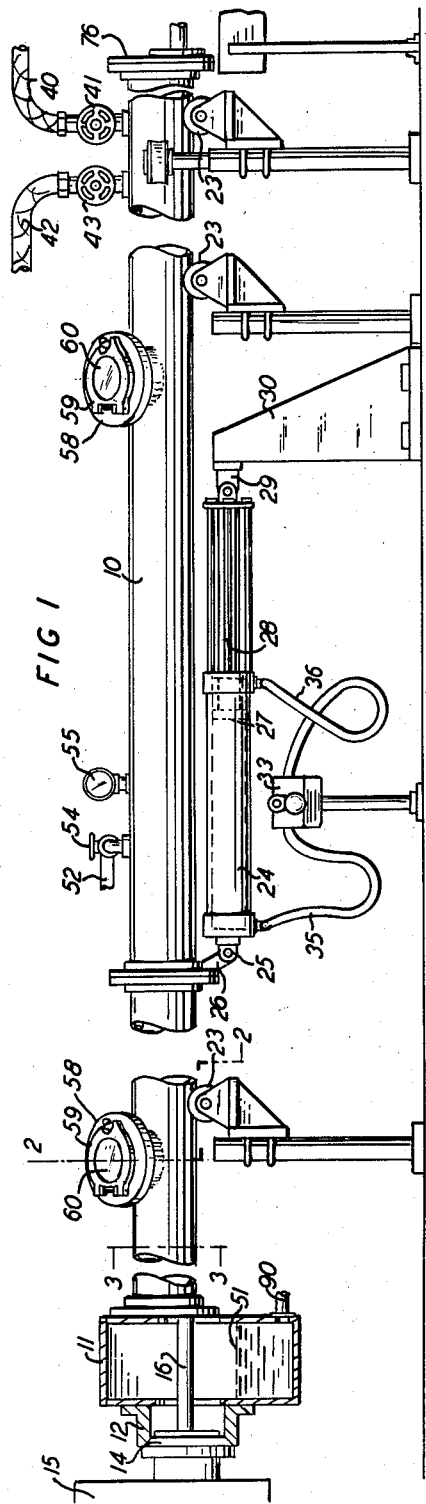
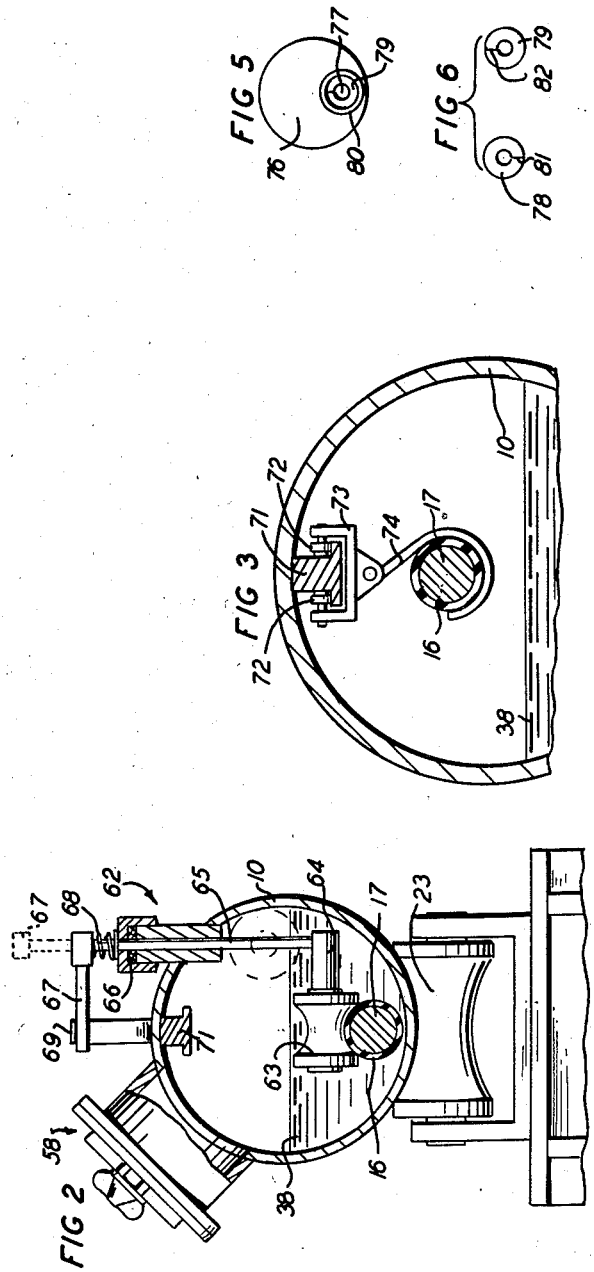
INVENTORS
C. A. HALLAM
S. PITT
BY
ATTORNEY June 10, 1958  C. A. HALLAM ET AL  2,837,764
PRESSURIZED COOLING TROUGH FOR EXTRUDERS
Filed March 15, 1955  2 Sheets-Sheet 2
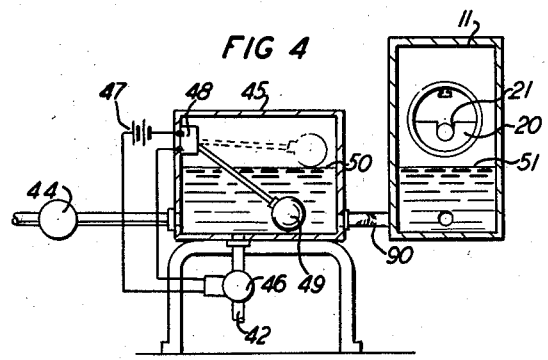
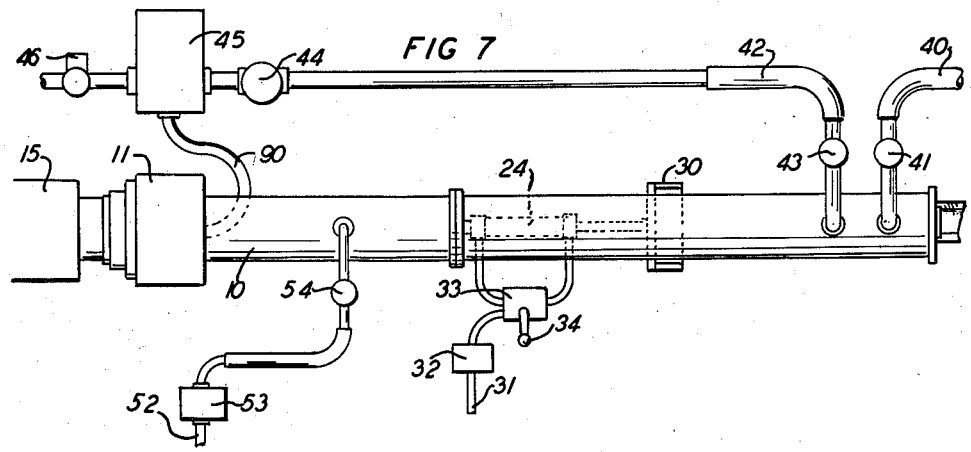
INVENTORS
C. A. HALLAM
S. PITT
BY
ATTORNEY

United States Patent Office 2,837,764
Patented June 10, 1958

2,837,764

PRESSURIZED COOLING TROUGH FOR EXTRUDERS

Cecil A. Hallam, Westfield, and Samuel Pitt, Cranford, N. J., assignors to Western Electric Company, Incorporated, New York, N. Y., a corporation of New York Application March 15, 1955, Serial No. 494,402

1 Claim. (Cl. 18—6)

This invention relates to cooling apparatus for extruded cable and more particularly to pressurized cooling troughs for attachment to cable extruders.

In certain methods of manufacturing cable a sheath of plastic material such as polyethylene is extruded on a cable core. During the extrusion process, the soft plastic sheath is not forced into close engagement with the core but in a sense is laid onto the core making it possible for air, gas or vapors to be entrapped within the sheath and thereby causing blisters and bubbles to form when forcing their way out through the soft sheath.

The object of the present invention is to prevent the formation of blisters or bubbles in the plastic sheath.

With this and other objects in view, the invention comprises a closed trough in combination with an apparatus for extruding a plastic sheath on a core while advancing longitudinally in a given path, the trough sealed to the outlet of the extruding apparatus and surrounding said path whereby the trough is partially filled with water to cool the sheath and air under pressure radially applied to the sheath in the trough keeps the freshly extruded sheath under pressure until it has cooled sufficiently to withstand the gas pressure.

In the present embodiment of the invention, the trough has a header box which receives and draws off the cooling water, keeping it out of contact with the hot extruder and making it possible to apply the pressure to the cable as soon as it is formed. A number of observation ports are provided for the trough adjacent to which are hold-down units including rollers disposed in one position under the force of spring means to hold the sheathed core submerged, but movable free of the path of the core during intervals when the core is threaded through the trough. During the threading operation, a carriage on a longitudinal track is movable from one end of the trough to the other to support the ends of the core free of the water.

Other objects and advantages will be apparent from the following detailed description when considered in conjunction with the accompanying drawings, wherein:

Fig. 1 is a side elevational view of the trough attached to the exit end of an extrusion apparatus;

Fig. 2 is an enlarged sectional view taken substantially along the line 2—2 of Fig. 1;

Fig. 3 is an enlarged sectional view taken substantially along the line 3—3 of Fig. 1;

Fig. 4 is a sectional view of the header portion of the trough and the float control unit;

Fig. 5 is an end elevational view of the trough;

Fig. 6 is a view illustrating a pair of wiping discs consisting partly of the seal at the exit end of the trough, and Fig. 7 is a schematic view of the apparatus.

In the present embodiment of the invention, the trough 10 is a pipe-like structure approximately 12 inches in diameter and 80 feet in length. A header 11 is a rectangular structure fixed to the entrance end of the trough and having an annular seal 12 adapted for engagement with the exit end 14 of an apparatus 15 adapted to extrude a plastic sheath 16 (Fig. 3) on a cable core 17.

The trough 10 has a dam 20 (Fig. 4) closing the lower portion of the inner area of the trough 10 adjacent the entrance end thereof up to a given level except for a groove 21 through which the sheathed core travels. The dam 20 determines approximately the height of the water level in the trough. The trough 10 is supported by a series of rollers 23, disposed at spaced positions throughout its length, and adapted for longitudinal movement under the control of an air cylinder 24 having one end pivotally connected at 25 to a bracket 26 fixed to the trough while its piston 27 has its piston rod 28 pivotally connected at 29 to a fixed bracket 30. In Fig. 7, an air supply line 31 leads through an air regulator 32 to a four-way valve 33. The valve 33 is manually actuable through a lever 34 to direct air under pressure through line 35 to the left end of the cylinder 24 or through line 36 to the right end of the cylinder. This constitutes the means for moving the trough 10 toward or away from the extrusion apparatus 15 and to apply a predetermined holding force to seal the trough at 12—14 to the extruder.

The cooling medium or water 38 is initially supplied to the trough from a supply line 40 through a valve 41 which may be adjusted, if desired, to allow a given quantity of water to flow continuously into the trough to replenish the amount which may be removed with the extruded core. A circulating system for the water enters the trough 10 through line 42 and valve 43, and includes a motor driven pump 44. The header 11 is connected to a float control unit 45 and includes a solenoid valve 46 for a drain. The solenoid valve 46 is shown schematically in Fig. 4 in an electrical circuit 47 which is under the control of a normally open switch 48, which may be termed a float switch in that it is actuated by a float 49. The unit 45 is disposed at one side of the header 11 so that a desired water level 50 in the unit will be parallel with the desired water level 51 in the header 11. Should the water levels 50 and 51 rise above the desired plane, the solenoid valve 46 will open the drain and allow water to escape until the desired levels are reached.

As illustrated in Fig. 7, an air supply line 52 leads through a regulator 53 and a valve 54 so that air under a predetermined pressure indicated by a gage 55 may be maintained in the trough.

A plurality of observation ports 58 is provided for the trough. These ports are disposed at desired spaced positions and have pivotally mounted covers 59 with transparent windows 60 so that the operator may observe the interior of the trough. Roller units, indicated generally at 62, are disposed adjacent each observation port 58 including in each instance a roller 63 grooved to partially conform to the sheathed core and rotatably mounted on a spindle 64 which has one end fixed to a vertical rod 65. The rod 65 extends through and is movably disposed in a sealed bearing 66 mounted in the wall of the trough 10. The upper end of the rod 65 is fixed to a handle 67 which is urged upwardly normally by a spring 68 to the dotted position or held in the operating or holding position by a resilient catch 69.

An inverted T-shaped track 71 fixed to the inner surface of the trough at the uppermost portion thereof and extending the full length thereof supports rollers 72 of a carriage 73 which supports a pivotal hook 74 as illustrated in Fig. 3.

The exit end of the trough has a main cover 76 with an opening 77 in the lower portion thereof. The cover 76 is fixed and sealed to the exit end of the trough and is provided with sealing means for the opening 77 including flexible members 78 and 79 (Fig. 6) mounted by suitable retaining means 80 at the outlet aperture 77. It will be noted that the members 78 and 79 are substantially identical with the exception of their cut portions 81 and 82 which are substanitally diametrically opposed to permit them to be assembled readily, if desired, about a cable core and to cooperate in forming an airtight seal for the exit end of the trough.

Considering now the function of the trough, let it be assumed that a cable is to be threaded through the trough. In this instance, the trough is spaced from the extruding apparatus a distance making it possible for the leading end of the cable core to be placed on the hook 74 of the carriage 73 and supported thereby during movement of the extruded core longitudinally through the trough. In actual practice, there is an observation port 58 closely adjacent the entrance end of the trough and also adjacent the exit end thereof, permitting the operator to observe placing the leading end of the sheathed core on the hook portion of the carriage (Fig. 3) and the removal of this portion therefrom when it reaches the exit end of the trough for guiding the leading end of the sheathed core through the passageway 77. If desired, suitable means may be provided to manually move the carriage 73 on its track 71 longitudinally of the trough between the ends thereof.

After the extruded core has been threaded through the trough and connected to the conventional advancing means, the trough may be moved longitudinally, through actuation of the valve 33 to cause air under pressure to pass through line 35 filling cylinder 24, causing movement of the cylinder to the left relative to the piston 27 to force the trough into close engagement with the exit end of the extruding apparatus to thereby seal the trough to the apparatus. If the core is formed of suitably heavy wires such as copper, the sheathed core of its own weight will ride along the bottom of the trough. However, if the wires of the core are of aluminum, it will tend to float maknig it necessary to bring the roller units 62 into the holding positions shown in Fig. 2 where they are swung from the dotted line positions to positions above the sheathed core and moved downwardly against the forces of their springs 68 until the arms 67 are latched in place. This operation may be observed through each adjacent port 58. After each holding unit 62 is in place, valves 41 and 43 may be opened to allow fresh water to enter the trough through line 40 and to cause circulation of the water in the trough through line 42. The water will fill the trough to a given level determined by the height of the dam 20, which may be observed through an adjacent observation port and excess water will overflow the dam into the header 11 where a portion of the water will pass into the unit 45 through line 90 so that the levels 50 and 51 in the unit 45 and the header 11 respectively are identical. As long as the water does not exceed the levels 50 and 51 the solenoid valve 46 will remain closed to allow continuous circulation of the water 38 in the trough to cool the sheath extruded on the core. However, if the levels 50 and 51 exceed the given plane, the switch 48 will be closed to energize the solenoid valve 46 to open the drain. This is of great importance in that the level of the water 51 must never reach the point where it will flow into the extruded or extruding apparatus 15.

The admission of air under pressure from supply line 52 through the regulator 53 and valve 54 above the water in the trough will apply radial forces to the sheath beginning with the entrance end of the trough and thereby force the entrapped air, gas or vapors back through the extruded sheath and hold the newly formed sheath down on the core until it has set, thereby preventing the formation of bubbles in the sheath.

It is to be understood that the above described arrangements are simply illustrative of the application of the principles of the invention. Numerous other arrangements may be readily devised by those skilled in the art which will embody the principles of the invention and fall within the spirit and scope thereof.

What is claimed is:

The combination with an apparatus for extruding a plastic sheath on a core while advancing longitudinally in a given horizontal path, of a closed trough disposed in a horizontal plane to surround the path and having an entrance end and an exit end, means having an exit passageway therethrough for the sheathed core sealing the exit end of the trough about the sheathed core, means to direct water into the trough, a dam mounted in the lower portion of the entrance end of the trough, recessed in its upper surface for the sheathed core and controlling the depth of water in the lower portion of the trough to surround the sheathed core, a receptacle, with one opening fixed to the entrance end of the trough, and another opening removably sealed to the outlet of the extruding apparatus, extending below the openings to receive the water overflowing the dam, means actuated when the level of the water in the receptacle reaches a position short of the outlet of the extruding apparatus to open a drain for the water, and means to force air under a predetermined controlled pressure into the trough to force the sheath into intimate engagement with the core to force air from between the sheath and the core back toward the extruding apparatus.

References Cited in the file of this patent

UNITED STATES PATENTS

| | | |
|---|---|---|
| 1,009,504 | Gosselin | Nov. 21, 1911 |
| 1,388,435 | Kilborn | Aug. 23, 1921 |
| 2,438,003 | Edwards et al. | Mar. 16, 1948 |
| 2,561,820 | Ramsey et al. | July 24, 1951 |
| 2,582,165 | Rosenfeld | Jan. 8, 1952 |
| 2,634,459 | Irons | Apr. 14, 1953 |
| 2,737,685 | Fitler | Mar. 13, 1956 |
| 2,744,336 | Milne | May 8, 1956 |
| 2,765,441 | Gambrill | Oct. 2, 1956 |